(12) United States Patent
Lipke (10) Patent No.: US 7,648,126 B2
(45) Date of Patent: Jan. 19, 2010

(54) SYSTEMS AND METHODS FOR CONTROLLING ROPE

(75) Inventor: Rick Lipke, Bellingham, WA (US)

(73) Assignee: Conterra, Inc., Bellingham, WA (US)

( * ) Notice: Subject to any disclaimer, the term of this patent is extended or adjusted under 35 U.S.C. 154(b) by 82 days.

(21) Appl. No.: 11/999,274

(22) Filed: Dec. 4, 2007

(65) Prior Publication Data

US 2008/0128669 A1    Jun. 5, 2008

Related U.S. Application Data (60) Provisional application No. 60/873,230, filed on Dec. 5, 2006.

(51) Int. Cl.
B66D 3/04 (2006.01)
(52) U.S. Cl. .................................... 254/389
(58) Field of Classification Search .......... 254/389; 182/5, 192, 65.4, 6, 191; 188/65.1, 65.2, 188/65.4, 65.5; 24/129 R, 129, 115 M, 129 B
See application file for complete search history.

(56) References Cited

U.S. PATENT DOCUMENTS 26,071 A    11/1859  Knapp et al.

(Continued)

OTHER PUBLICATIONS

Conterra, "Hyper II brake rack", 1 page.

(Continued)

*Primary Examiner*—Emmanuel M Marcelo
(74) *Attorney, Agent, or Firm*—Michael R. Schacht; Schacht Law Office, Inc.

(57) ABSTRACT

A rope control device comprising a main part and a bar part. The main part defines a central opening, first and second side portions, first and second end portions, at least one projection portion extending from each end portion, and a friction surface formed at junctures of each end portion and the at least one projection portion adjacent thereto. The bar part is pivotably attached to the first side portion. The bar part may be in a closed position in which the bar part engages the second side portion of the main part. The rope control device may be in an open configuration in which the bar part does not engage the second side portion. When the bar part is in the closed position, the main part and the bar part define first and second opening portions of the central opening.

18 Claims, 8 Drawing Sheets

U.S. PATENT DOCUMENTS

| | | | |
|---|---|---|---|
| 285,603 A * | 9/1883 | Fell | 188/65.3 |
| 785,019 A | 3/1905 | Parker | |
| 3,217,840 A | 11/1965 | Holkesvick | |
| 3,656,745 A * | 4/1972 | Holkesvick | 482/120 |
| 3,678,543 A | 7/1972 | Hobbs | |
| 3,695,397 A * | 10/1972 | Hobbs | 188/65.4 |
| 3,757,901 A * | 9/1973 | Hobbs | 188/65.4 |
| 3,930,288 A | 1/1976 | Black | |
| 4,311,218 A * | 1/1982 | Steffen | 188/65.4 |
| 4,678,059 A | 7/1987 | Bowker | |
| 4,687,077 A * | 8/1987 | Bobick | 182/235 |
| 4,723,634 A | 2/1988 | Fisk | |
| 4,774,742 A | 10/1988 | Johnson | |
| 5,145,036 A * | 9/1992 | Omalia | 188/65.5 |
| 5,217,092 A | 6/1993 | Potter | |
| 5,295,559 A * | 3/1994 | Nutkins | 188/65.4 |
| 5,467,845 A * | 11/1995 | Scruggs | 188/65.2 |
| 5,511,291 A | 4/1996 | Crawford | |
| D376,095 S | 12/1996 | Curtis | |
| 5,671,822 A | 9/1997 | Phillips | |
| 5,803,209 A * | 9/1998 | Suzaki | 188/65.2 |
| 6,062,340 A * | 5/2000 | Walker | 182/5 |
| 6,095,282 A | 8/2000 | Sadeck | |
| 6,131,697 A * | 10/2000 | Bassett | 182/5 |
| 6,510,599 B2 * | 1/2003 | AmRhein | 29/426.1 |
| 6,814,185 B1 * | 11/2004 | Ostrobrod | 182/193 |
| 6,962,238 B1 * | 11/2005 | Ostrobrod | 182/193 |

OTHER PUBLICATIONS

Kong "Italian Device", 1 page.

* cited by examiner

SYSTEMS AND METHODS FOR CONTROLLING ROPE

RELATED APPLICATIONS

This application claims priority of U.S. Provisional Patent Application Ser. No. 60/873,230 filed Dec. 5, 2006, the contents of which are incorporated herein by reference.

TECHNICAL FIELD

The present invention relates to systems and methods for controlling rope and, more particularly, to rope control assemblies that allow rope to be played out under control while under loads.

BACKGROUND OF THE INVENTION

Ropes are an essential part of a wide variety of activities related to health and safety, law enforcement recreation, and construction. In particular, the need often exists for a user to use a rope to control the movement of one object (hereinafter the load) relative to another object (hereinafter the anchor point).

Typically, but not necessarily, the anchor point is a fixed location on a structural member such as a tree, building, or the like, and the load is moved relative to the anchor point. However, the anchor point may be formed on a movable object such as a helicopter or ship. The load can take many different forms such as supplies, equipment, an injured person, and/or, in the case of rappelling, the person using the rope.

The construction and use of general purpose rope rigging devices such as tackle blocks, belay devices, ascenders, carabiners, and pulleys are well-known. In addition, numerous rigging devices have been developed specifically to facilitate the use of ropes to control movement of a load relative to an anchor point.

The need exists for lightweight and reliable rope control devices that may be used easily, flexibly, and in a variety of configurations to control movement of a rope to allow a load to be moved relative to an anchor point.

RELATED ART

The Applicant is aware of the following rope control devices that are currently available in the marketplace.

A product that may be referred to as a "Figure 8 Plate" is a flat plate defining first, second, and third holes arranged in a line in that order from a first end towards a second end along a longitudinal axis. The second hole is the smallest, and the third hole is the largest. First and second rounded lateral projections extend outwardly from each side of the plate adjacent to the third hole. A rope is passed through one or more of the holes and around one or more of the lateral projections to allow movement of the rope to be controlled using friction between the device and the rope.

A class of devices known as "Brake Racks" is also known in the art. These devices generally comprise an external frame formed by a U-shaped piece of metal that defines first and second legs and one or more cross-bars that can be pivoted about the first leg of the frame into a locked or unlocked position relative to the second leg of the frame. On example of a brake rack is sold by the Applicant under the tradename "Conterra Hyper 2."

SUMMARY OF THE INVENTION

The present invention may be embodied as a rope control device comprising a main part and a bar part. The main part defines a central opening, first and second side portions, first and second end portions, at least one projection portion extending from each end portion, and a friction surface formed at junctures of each end portion and the at least one projection portion adjacent thereto. The bar part is pivotably attached to the first side portion. The bar part may be in a closed position in which the bar part engages the second side portion of the main part. The rope control device may be in an open configuration in which the bar part does not engage the second side portion. When the bar part is in the closed position, the main part and the bar part define first and second opening portions of the central opening.

The present invention may also be embodied as a method of controlling a rope comprising the following steps. A main part is provided, the main part defining a central opening, first and second side portions, first and second end portions, at least one projection portion extending from each end portion, and a friction surface formed at junctures of each end portion and the at least one projection portion adjacent thereto. A bar part is pivotably connected to the first side portion of the main part such that the bar part may be in a closed position in which the bar part engages the second side portion of the main part, where the main part and the bar part define first and second opening portions of the central opening when the bar part is in the closed position. The rope control device may be in an open configuration in which the bar part does not engage the second side portion. The rope is arranged such that a first portion of the rope engages the bar part and a second portion of the rope engages one of the friction surfaces.

DETAILED DESCRIPTION OF THE INVENTION

Figure 1:
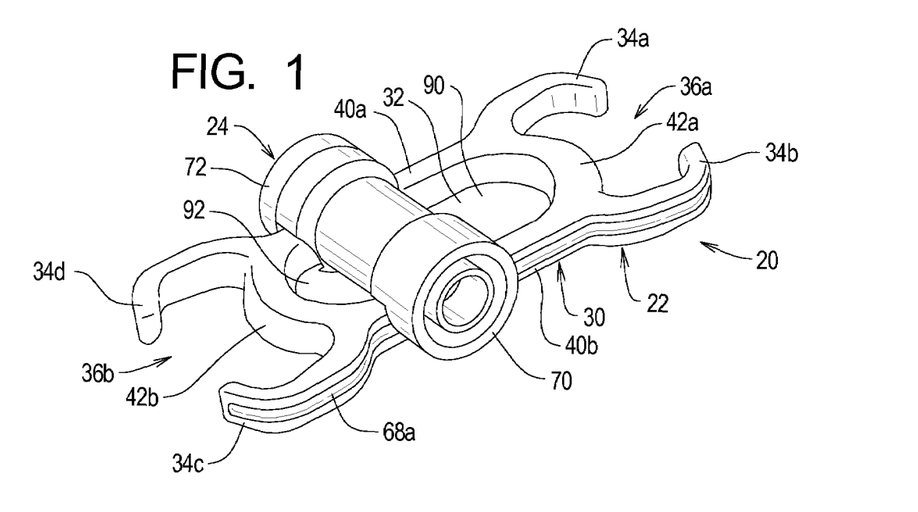
FIG. 1 is a perspective view of a rope control device of the present invention.
Figure 5:
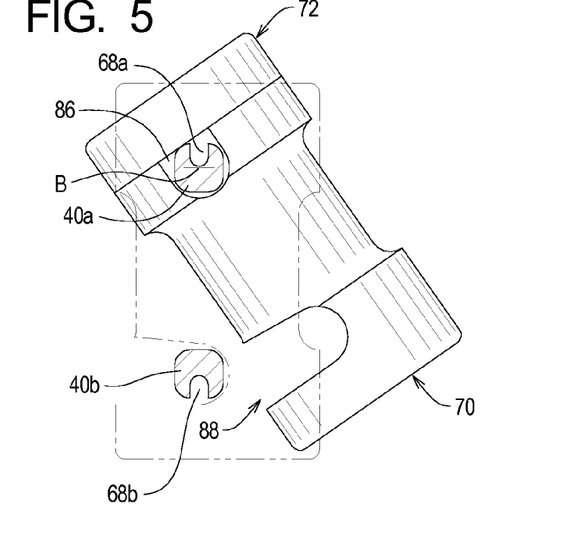
FIG. 5 is a partial section view illustrating movement of bar part relative to the main part of a rope control device as depicted in FIG. 1.

Referring initially to FIG. 1 of the drawing, depicted at 20 therein is a rope control device constructed in accordance with, and embodying, the principles of the present invention. The rope control device 20 is an assembly comprising a main part 22 and a bar part 24. As shown in FIG. 5 of the drawing, the bar part 24 is pivotably connected to the main part 22 for movement into and out of an engaged position (broken lines in FIG. 5).

The example main part 22 is a rigid member comprising a central portion 30 defining a central opening 32. The main part 22 further comprises first, second, third, and fourth projection portions 34a, 34b, 34c, and 34d extending from the central portion 30. The first and second projection portions 34a and 34b define a first end recess 36a, while the third and fourth projection portions 34c and 34d define a second end recess 36b.

Figure 2:
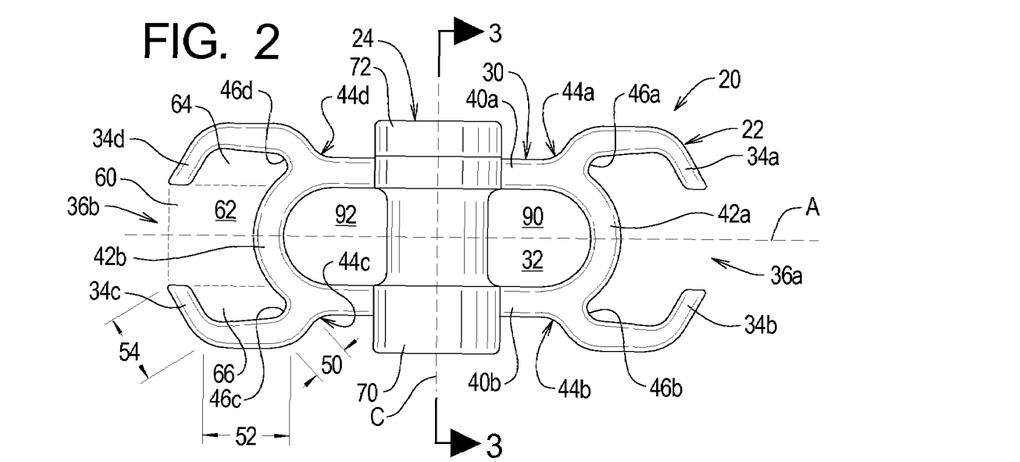
FIG. 2 is a plan view of a rope control device depicted in FIG. 1.

The example central portion 30 comprises first and second side portions 40a and 40b and first and second end portions 42a and 42b. The side portions 40a and 40b are generally straight and parallel, and the end portions 42a and 42b form a bridge between the side portions 40a and 40b. The side portions 40a and 40b are joined to the end portions 42a and 42b at first, second, third, and fourth juncture portions 44a, 44b, 44c, and 44d. As shown in FIG. 2, friction surfaces 46a, 46b, 46c, and 46d are formed within the end recesses 36a and 36b at the junctures between the projection portions 34 and the end portions 42a and 42b. The example central portion 30 is symmetrical about a longitudinal axis A (FIG. 2).

The projection portions 34 extend from the central portion 30 at the juncture portions 44, respectively. Each of the projection portions 34 defines a proximal portion 50, an intermediate portion 52, and a distal portion 54. The proximal portions 50 extend away from the juncture portions 44 at an angle with respect to the longitudinal axis A. The intermediate portions 52 extend at an angle relative to the proximal portions 50 and are substantially parallel to the longitudinal axis A. The distal portions 54 extend at an angle relative to the intermediate portions 52 and also at an angle inwards towards the longitudinal axis A.

Each of the end recesses 36 defined by the projection portions 34 defines an inlet portion 60, a main portion 62, and first and second lateral portions 64 and 66. The inlet portions 60 extend between tips of the distal portions 54 of projection portions 34, while the main portions 62 are located between the inlet portions 60 and the end portions 42 of the central portion 30. The lateral portions 64 and 66 of the end recesses 36 are formed on either side of the main portion 62 and are bounded on three sides by the projection portions 34. The friction surfaces 46 lie within the lateral portions 64 or 66 of the end recesses 36.

In the example rope control device 20, inner surfaces of the intermediate portions 52 are in line with outer surfaces of the side portions 40 of the central portion 30 of the main part 22. The example distal portions 54, the lateral portions 64 or 66 of the end recesses 36, and the friction surfaces 46 are along a line spaced from and parallel the axis A. The distal portions 54 thus extend over the friction surfaces 46 when the main part 22 is viewed along the longitudinal axis A.

In addition, the friction surfaces 46 are curved towards the lateral portions 64 or 66. The radius of curvature of the example friction surfaces 46 is not constant, and the friction surfaces 46 generally take the form of a V-shape.

Figure 3:
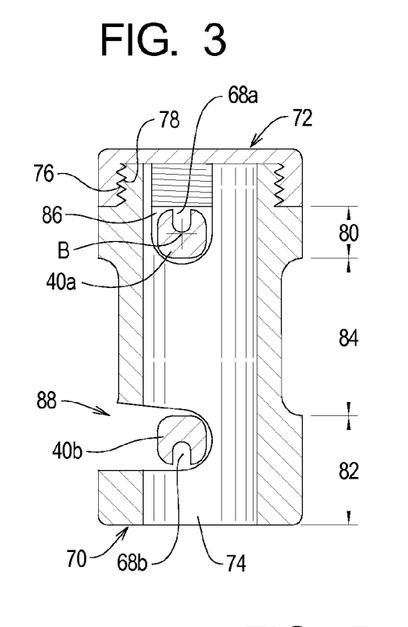
FIG. 3 is a section view taken along lines 3-3 in FIG. 2.
Figure 4:
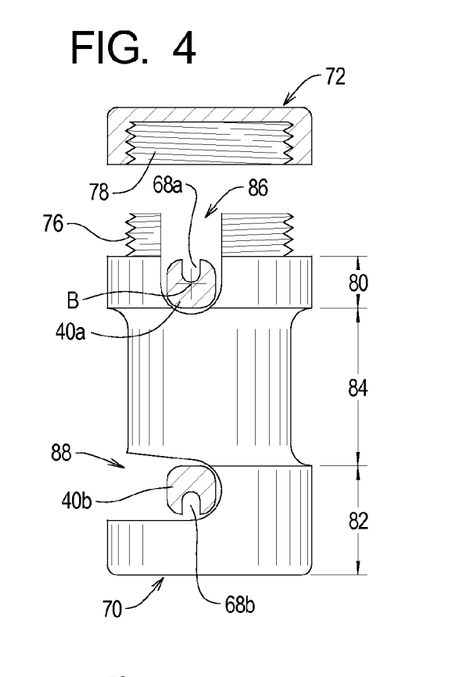
FIG. 4 is a partial section view similar to that of FIG. 3 illustrating the assembly of a bar part relative to a main part to obtain a rope control device as depicted in FIG. 1.

As shown for example in FIGS. 3-5, the basic shape of the cross-sectional area of the main part 22 is rectangular or square with rounded corners. However, as perhaps best shown in FIGS. 1 and 3-5, flutes or grooves 68a and 68b are formed along at least part of the example main part 22. In particular, FIG. 1 illustrates that the example flute 68a extends along surfaces of the second side portion 40b and the second and third projection portions 34b and 34c. The groove 68b (not visible in FIG. 1) similarly extends along the first side portion 40a and the first and fourth projection portions 34a and 34d.

Referring again to FIGS. 3-5, the example grooves 68a and 68b extend approximately to the center of the first and second side portions 40a and 40b. The grooves 68a and 68b should remove a first range of approximately 12-20% of the cross-sectional area of at least a portion of the part 22 or a second range of approximately 10-25% of the cross-sectional area of a least a portion of the part 22. The example grooves 68a and 68b remove approximately 16% of the cross-sectional area of each of the first, second, third, and fourth projection portions 34a, 34b, 34c, and 34d and the first and second side portions 40a and 40b of the part 22. The example grooves 68a and 68b are also formed on outward facing surfaces of the projection portions 34a, 34b, 34c, and 34d and the side portions 40a and 40b of the part 22.

The flutes or grooves 68 reduce the weight of the part 22. In particular, the grooves 68 should be sized and dimensioned to reduce the weight of the part 22 without compromising the ability of the part 22 to withstand the loads to which it will be subjected. Additionally, as will be described in further detail below, the part is designed to be used in conjunction with a rope. Friction between such a rope and the part 22 can cause heat to build up within the part 22. This stored heat can degrade the function of the rope under certain circumstances. The example flutes or grooves 68 facilitate the dissipation of heat energy stored within the part 22 by increasing the surface area of the part 22 that is exposed to ambient air. Also, the example flutes or grooves 68 are formed on surfaces of the part 22 that are not likely to come into contact with the rope, thereby reducing the likelihood that the part 22 will abrade the rope.

As perhaps best shown in FIG. 4, the example bar part 24 is an assembly comprising a bar member 70 and a cap member 72. The bar member 70 defines a bar chamber 74. A first threaded portion 76 is formed on the bar member 70, and a second threaded portion 78 is formed on the cap member 72. The bar member 70 and cap member 72 are joined together to form the bar part 24 by engagement of the first and second threaded portions 76 and 78.

The bar member 70 defines first and second end surfaces 80 and 82, an intermediate surface 84, and first and second notches 86 and 88. The diameter of the example end surfaces 80 and 82 are slightly larger than that of the intermediate surface 84. The diameter of the example intermediate surface 84 is smaller at its end portions (adjacent to the end surfaces 80 and 82) than at its central portion between its end portions.

The first notch 86 terminates in the first threaded portion 76 such that, when the cap member 72 is secured to the bar member 70, the first notch 86 is closed to define an opening in the bar part 24. The second notch 88 terminates in the second end surface 82 and the intermediate surface 84 and is spaced from the first notch 86 a distance substantially equal to the distance between the side portions 40a and 40b of the central portion of the main part 22.

As shown in FIGS. 3-5, the first side portion 40a is placed in the first notch 86 of the bar member 70 and the cap member 72 is threaded onto the bar member to capture the first side portion 40a within the opening in the bar member 70 defined by the first notch 86. The bar part 24 thus is capable of pivoting relative to the main part 22 about a pivot axis B defined by the first side portion 40a.

When the bar part 24 is in a closed position relative to the main part 22 (FIGS. 1-4 and broken lines in FIG. 5), the second side portion 40b of the main part 22 is received within second notch 88. When the bar part 24 is rotated about the pivot axis B out of the closed position relative to the main part 22 (solid lines in FIG. 5), the second side portion 40b is no longer received within the second notch 88.

When the bar part 24 is in the closed position, the bar part 24 divides the central opening of the main part 22 into first and second opening portions 90 and 92. The bar part 24 may be slid along main part towards and away from the end portions 42a and 42b to change the cross-sectional areas of the opening portions 90 and 92 (e.g., portion 90 has a larger cross-sectional area than portion 90 in FIG. 1).

The main part 22 and bar part 24 may be made of one or more of aluminum, titanium, stainless steel, plastic, composites, and/or combinations thereof. Selection of an appropriate material will be made for a particular market and/or operating environment based on factors such as cost, strength, heat dissipation, wear resistance, corrosion resistance, and weight.

The rope control device 20 may be used in a variety ways to control the playing out of one or more ropes while the rope or ropes are under loads. Referring now to FIGS. 6-11 of the drawing, a number of methods of using the rope control device 20 to control movement of a single primary rope 120 are depicted.

Figures 6, 7:
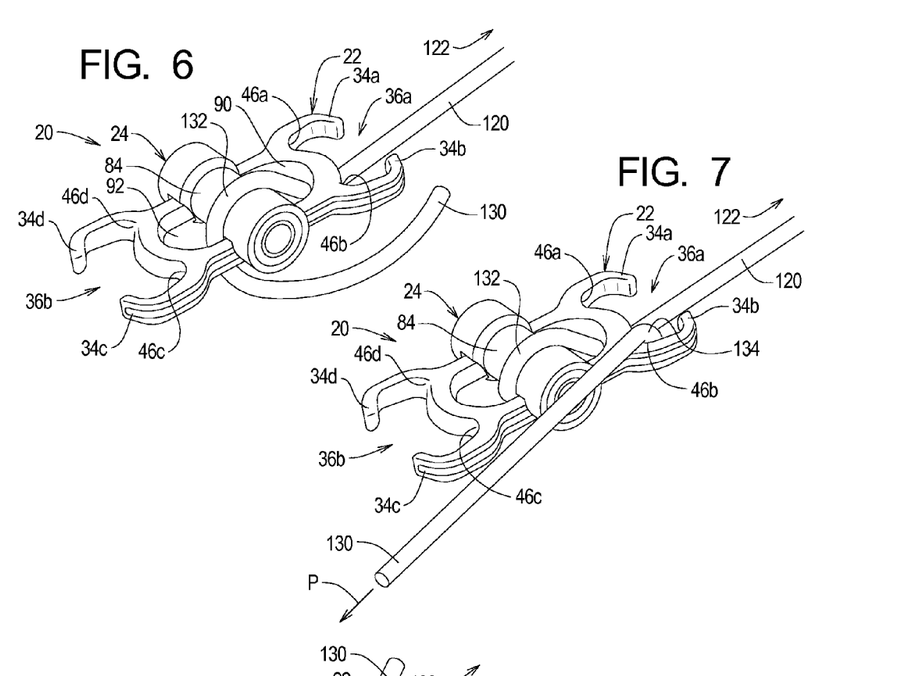
FIGS. 6-12 illustrate a plurality of methods of use of a rope control device as depicted in FIG. 1 to control movement of a rope structure.

FIGS. 6 and 7 illustrate that control of the rope 120 under light loads may be performed using the rope control device 20 by passing the primary rope 120 through the first and second opening portions 90 and 92 and around the bar part 24. Typically, as shown by the example depicted in FIG. 13, a distal end 122 of the rope 120 is secured to a structural point 124 and a load (not shown) is connected to the rope control device 120 by a clip 126 and fixed rope 128. The connections to the structural point 124 and the load can take forms other than those depicted in FIG. 13.

If a free end 130 of the rope 120 is available, the bar part 24 may be placed or left in the closed position relative to the main part 22 and the free end 130 threaded through the first opening 90, around the bar part 24, and through the second opening 92. If, however, the free end 130 is not adjacent to the rope control device 20, the bar part 24 may be rotated out of the closed position and a first intermediate portion 132 of the rope 120 may be looped around the bar part 24. The bar part 24 may then be rotated back into the closed position to capture the rope 120 within the first and second openings 90 and 92 as shown in FIGS. 6 and 7. When the rope 120 is under loads, the first intermediate portion 132 will be in contact is with the intermediate surface 84 of the bar part 24.

When the rope 120 is captured within the first and second openings 90 and 92, a second intermediate portion 134 of the rope 120 may then be placed into the first notch 36a as shown in FIG. 7. When the rope 120 is under loads, the second intermediate portion 134 will be in contact with the second friction surface 46b of the main part 22.

As described above, the friction surfaces 46 are curved towards the lateral portions 64 and 66. The curvature of these surfaces 46 increases the surface area of the main part 22 in contact with the rope 120 and thus the friction between these surfaces 46 and the rope 120. In addition, the general V-shape of the example friction surfaces 46 tends to wedge or pinch the rope between the end portions 42 and the projection portions 34 to further increase friction between the surfaces 46 and the rope 120.

With the rope configured as shown in FIG. 7, pulling the free end 130 in a pull direction (shown by arrow P in FIG. 7) away from the rope control device 20 can move the load connected to the device 20 towards the structural point to which the distal end 122 is connected.

Figure 13:
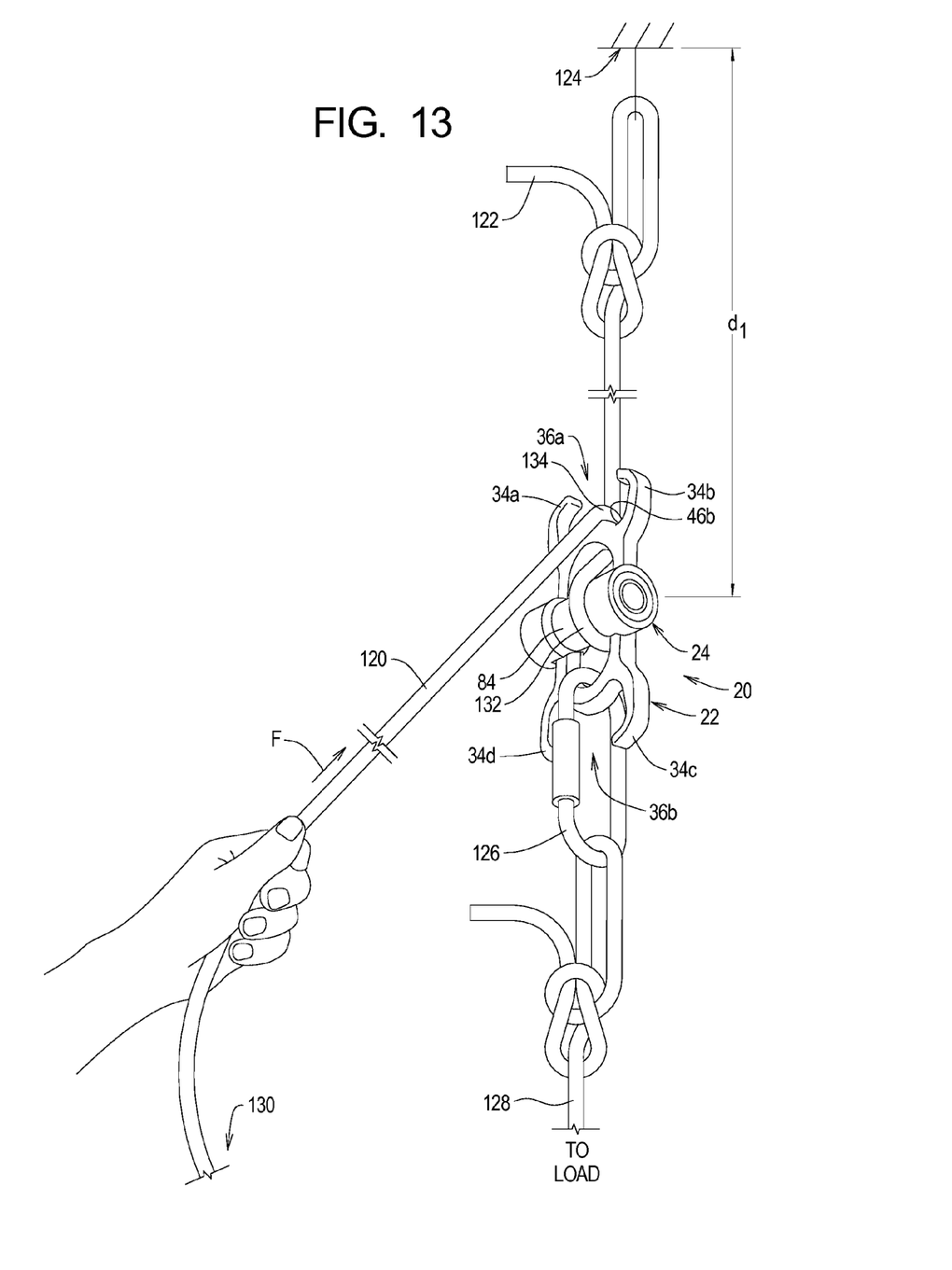
FIGS. 13-14 depict a first use configuration of using a rope control device as depicted in FIG. 1.
Figure 14:
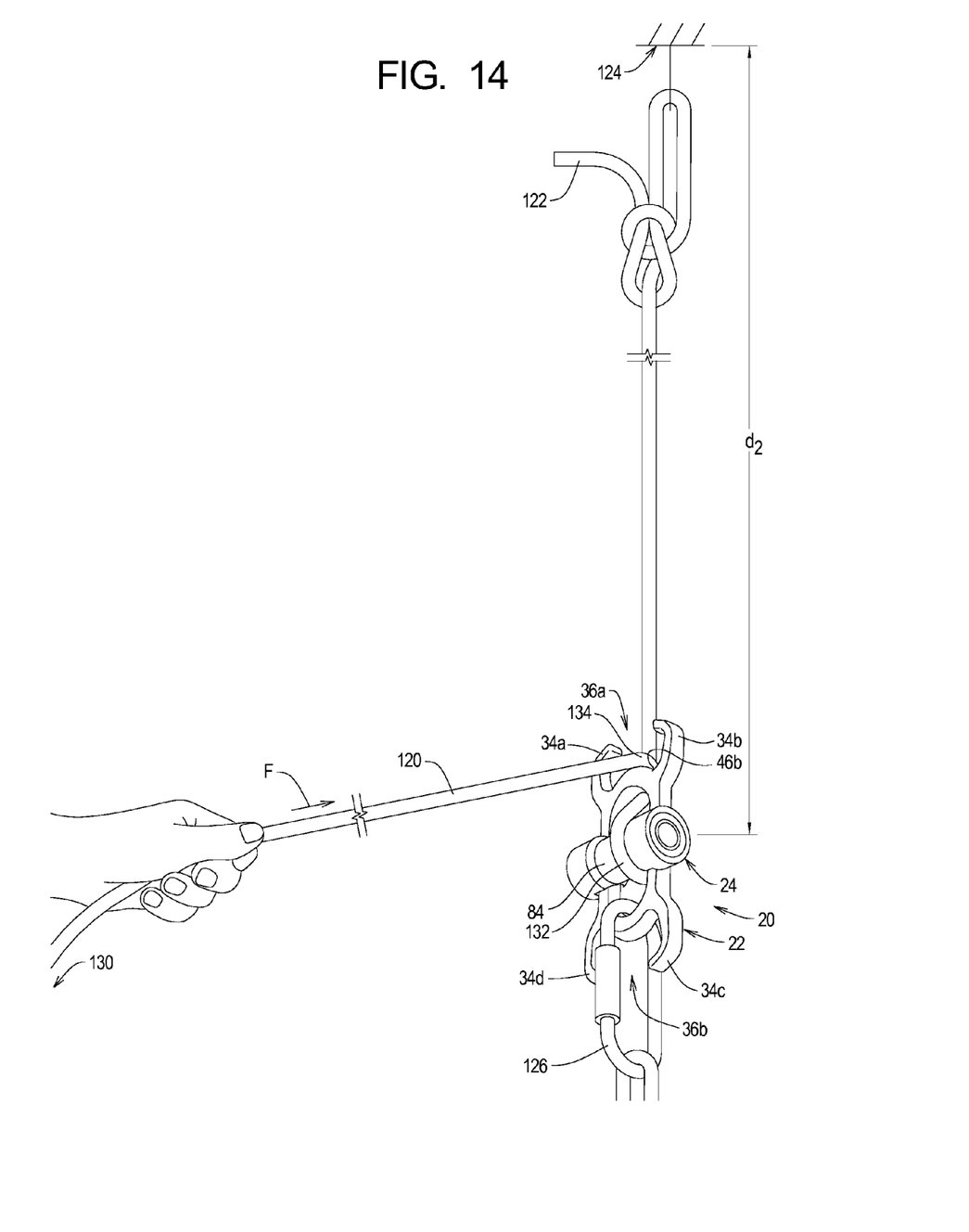

The rope control device 20 will, however, typically be used to allow the load connected to the device 20 to be moved away from the structural point 124 to which the distal end 122 is connected. For example, FIGS. 13 and 14 illustrate the rope 120 being fed in a feed direction indicated by an arrow F (opposite the pull direction) towards the device 20 to increase a distance between the structural point 124 and the rope control device 20 and thus between the structural point 124 and the load. The distance $d_1$ in FIG. 13 is shorter than the distance $d_2$ in FIG. 14 after the rope 120 has been fed in the direction of arrow F relative to the rope control device 20.

Friction between first intermediate portion 132 of the rope 120 and the intermediate surface of the bar part 24 and between the second intermediate portion 134 and the friction surface 46b of the main part 22 facilitates control of movement of the rope 120 relative to the rope control device 20 and thus of movement of the load relative to the structural point.

With larger loads, the friction between the rope 120 and the rope control device 20 when configured as shown in FIG. 7 may be insufficient to allow a user to control movement of the rope 120 relative to the rope control device 20. In this case, a third intermediate portion 136 of the rope 120 may be placed into the second end recess 36b and pulled against the third friction surface 46c as generally shown in FIG. 8.

Figures 8, 9:
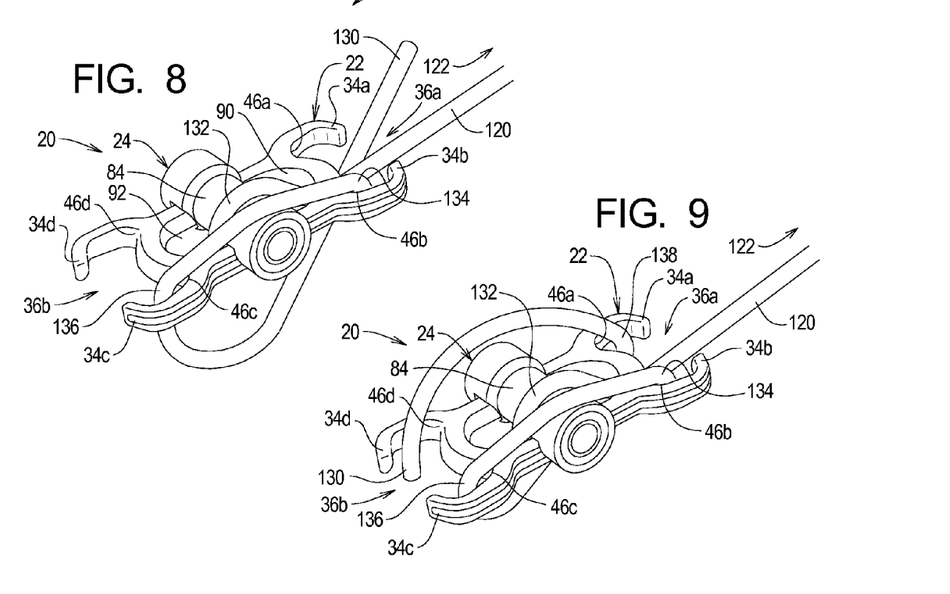

If the additional friction between the third portion 136 and the third friction surface 46c is still insufficient to control playing out of the rope 120 relative to the device 20, a fourth intermediate portion 138 of the rope 120 may be placed into the first end recess 36a and brought against the first friction surface 46a as shown in FIG. 9.

Figure 10:
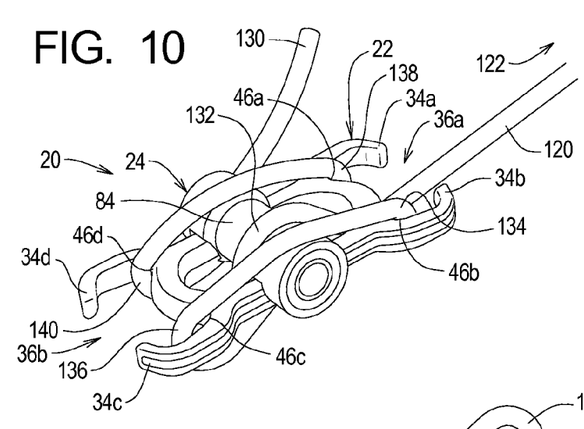

If the cumulative friction between the rope portions 132, 134, 136, and 138 and the surfaces 84, 46b, 46c, and 46a is still insufficient to control movement of the rope 120 relative to the rope control device 20, a fifth intermediate portion 140 of the rope 120 may be placed into the second end recess 36b and brought into contact with the fourth friction surface 46d as shown in FIG. 10.

Figure 11:
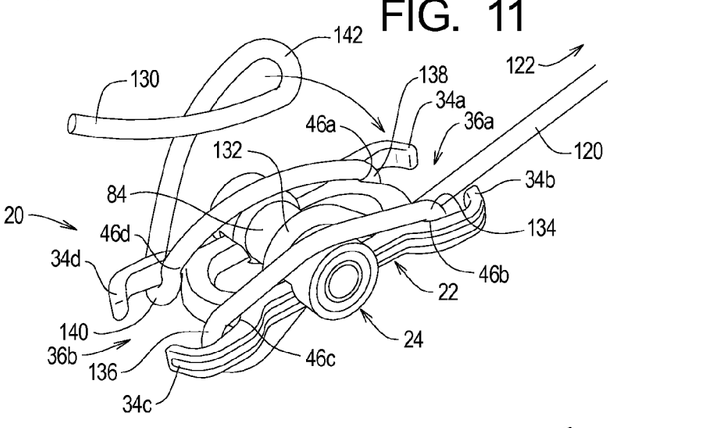

If the relationship of the rope 120 relative to the rope control device 20 must be fixed in any of the positions depicted in FIG. 7, 8, 9, or 10, a twisted loop may be formed in the rope 120 and placed over an opposing one of the projection portions 34. For example, FIG. 11 depicts a sixth intermediate portion 142 being formed into a twisted loop and drawn over the first projection portion 34a to lock the rope 120 relative to the device 20 in the position depicted in FIG. 10.

In any situation in which a portion of the rope 120 in inserted into an end recess 36, the projection portions 34 are configured such that the distal portions 54 thereof inhibit inadvertent removal of the rope portion from the end recess 36. The distal portions 54, which extend over the lateral portions 64 and 66 of the end recesses 36, as described above, engage the rope 120 to require a positive movement of the rope 120 towards the inlet portion 60 of the recesses 36. The configurations of the example projection portions 34 thus facilitate arrangement of the rope portions against the friction surfaces when loads are not applied to the rope to hold the rope portions against the friction surfaces 46.

Figure 12:
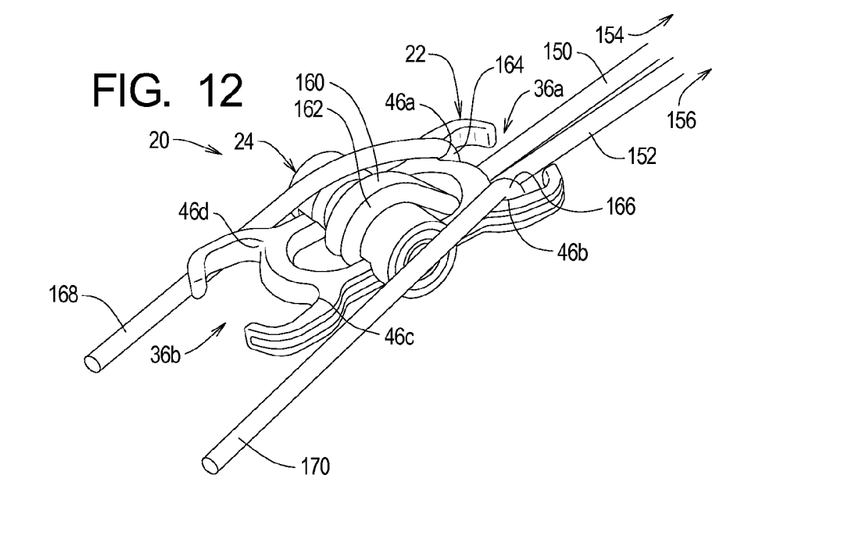

FIG. 12 illustrates the use of the rope control device 20 to control movement of first and second ropes 150 and 152. Again, one or more of distal ends 154 and 156 of the ropes 150 and 152, respectively, are typically fixed to one or more structural points and/or one or more loads. A load may also be connected to the rope control device 20.

First intermediate portions 160 and 162 of the ropes 150 and 152, respectively, are arranged over the bar part 24 as described above with reference to FIG. 6. Second intermediate portions 164 and 166 of the ropes 150 and 152, respectively, are placed into the first end recess 36a and drawn against the first and second friction surfaces 46a and 46b, respectively. The ropes 150 and 152 may be used in tandem to control movement of a load relative to an anchor point by displacing free ends 168 and 170 of the ropes 150 and/or 152 towards or away from the rope control device 20.

Figure 15:
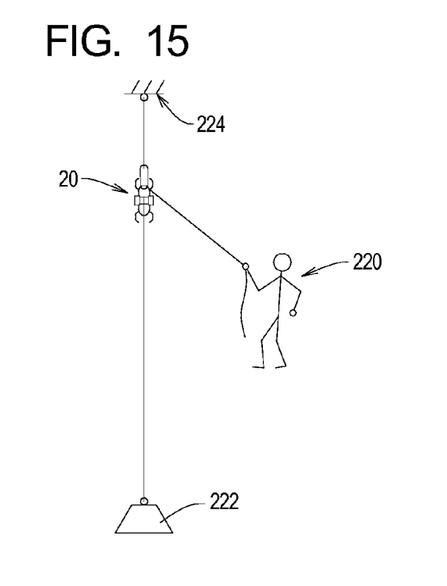
FIG. 15 schematically depicts the first use configuration of using a rope control device as depicted in FIG. 1.
Figure 16:
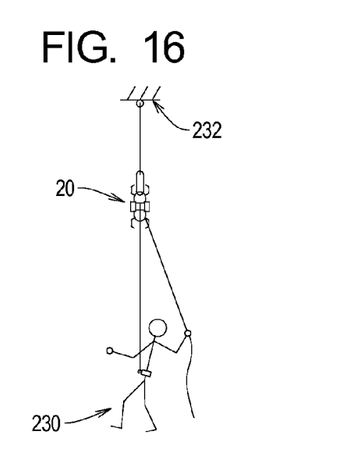
FIG. 16 schematically depicts a second use configuration of using a rope control device as depicted in FIG. 1.
Figure 17:
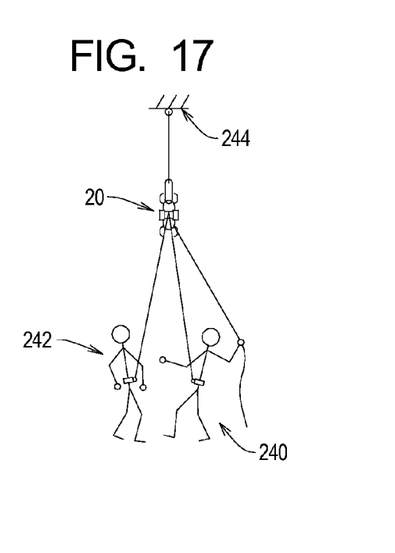
FIG. 17 schematically depicts a third use configuration of using a rope control device as depicted in FIG. 1.
Figure 18:
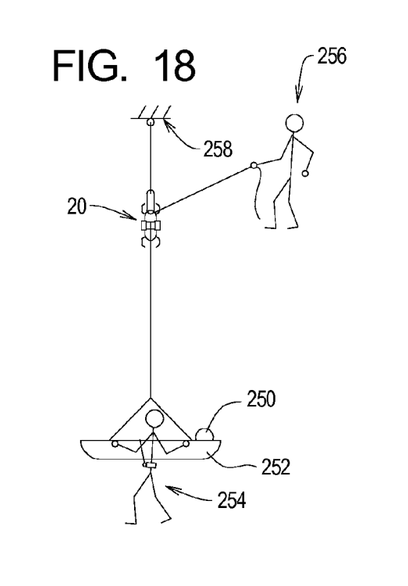
FIG. 18 schematically depicts a fourth use configuration of using a rope control device as depicted in FIG. 1.

FIGS. 15-18 schematically depict a number of environments in which the rope control device 20 may be used. In FIG. 15, a person 220 displaces a load 222 relative to a anchor point 224. In FIG. 16, a person 230 forms the load and displaces him or herself relative to a anchor point 232. In FIG. 17, a first person 240 and a second person 242 form the load, and the first person 240 displaces both the first and second persons 240 and 242 relative to a anchor point 244. In FIG. 18, a first person 250 in a stretcher 252 is attended by a second person 254, and a third person 256 displaces the first and second persons 250 and 254 relative to an anchor point 258.

Figure 19:
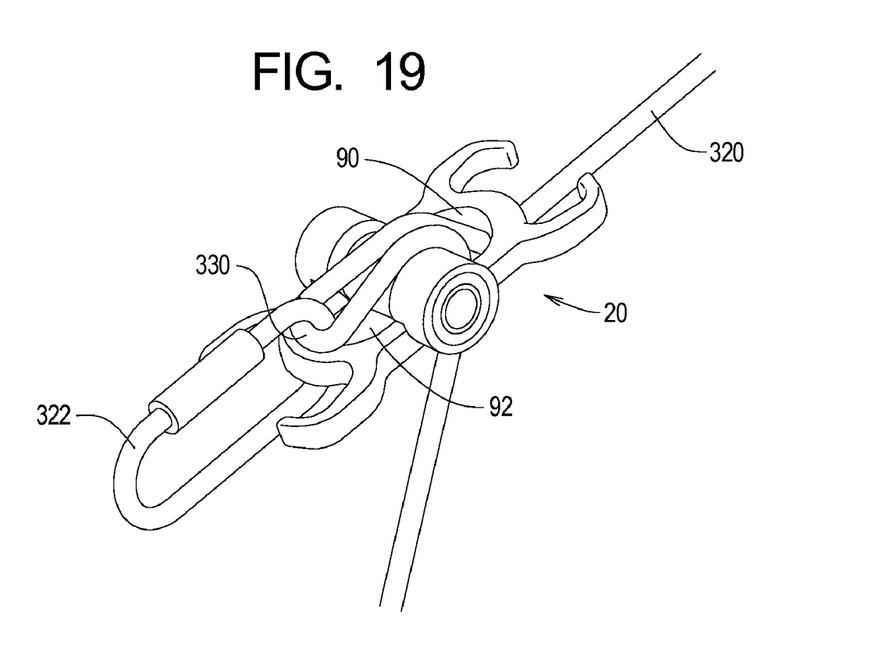
FIG. 19 depicts a fifth use configuration of using a rope control device as depicted in FIG. 1.

The rope control device 20 may be used in configurations other than those described and depicted herein. As one example, depicted in FIG. 19 is a configuration in which a rope 320 is used in conjunction with a clip 322 and the rope control device 20. A loop is formed in a first intermediate portion 330 of the rope 320 and inserted through the first opening 90 defined by the device 20. The loop formed by the first intermediate portion is then retained by the clip 322. The weight of any load applied to the clip 322 thus increases friction between the clip 322 and the portion of the rope in contact with the clip 322.

The example main part 22 of the rope control device 20 is substantially symmetrical about the longitudinal axis A. The main part 22 is further substantially symmetrical about a lateral axis C (FIG. 2) that is perpendicular to the longitudinal axis A and extends through the center of gravity of the main part 22. While the main part 22 need not be symmetrical within the broader teachings of the present invention, a symmetrical main part 22 as described herein allows the rope control device 20 to be used without regard to end to end orientation.

Further, although FIGS. 6-19 depict certain example uses of the example rope control device 20, the rope control device 20 can be used in other configurations. For example, instead of fixing one end of the rope to the anchor point and the rope control device 20 to the load, the end of the rope can be fixed relative to the load and the rope control device can be fixed relative to the anchor point.

The scope of the present invention should thus be determined by claims appended hereto and not the following detailed description of the example rope control device 20.

What is claimed is:

1. A rope control device comprising:
    a main part defining
        a central opening,
        first and second side portions,
        first and second end portions,
        at least one projection portion extending from each end portion, and
        a friction surface formed at junctures of each end portion and the at least one projection portion adjacent thereto; and
    a bar part comprising a bar member and a cap member, where the bar part is pivotably attached to the first side portion; where
    the bar part may be in a closed position in which the bar part engages the second side portion of the main part;
    the rope control device may be in an open configuration in which the bar part does not engage the second side portion; and
    when the bar part is in the closed position, the main part and the bar part define first and second opening portions of the central opening.

2. A rope control device as recited in claim 1, in which:
    a plurality of projection portions extend from each end portion of the main part; and
    a friction surface is formed at junctures of each end portion and the plurality of projection portions adjacent thereto.

3. A rope control device as recited in claim 1, in which:
    a pair of projection portions extend from each end portion of the main part; and
    a pair of friction surfaces is formed by junctures of each end portion and the pair of projection portions adjacent thereto.

4. A rope control device as recited in claim 1, in which:
    a pair of projection portions extend from each end portion of the main part; and
    an end recess is formed by each pair of projection portions.

5. A rope control device as recited in claim 1, in which each friction surface is curved.

6. A rope control device as recited in claim 1, in which each friction surface is generally V-shaped.

7. A rope control device as recited in claim 1, in which a first notch is formed in the bar member, where the first side portion of the main part is arranged within the first notch and the cap member is attached to the bar member to pivotably connect the bar part to the main part.

8. A rope control device as recited in claim 7, in which a second notch is formed in the bar part, where the second notch is arranged to receive the second side portion of the main part when the bar part is in the closed position.

9. A rope control device as recited in claim 1, in which a second notch is formed in the bar part, where the second notch is arranged to receive the second side portion of the main part when the bar part is in the closed position.

10. A rope control device as recited in claim 1, in which a first threaded portion on the bar member engages a second threaded portion on the cap member to form the bar part.

11. A rope control device as recited in claim 1, in which at least one projection portion comprises a distal portion that extends over the friction surface adjacent to that at least one projection portion.

12. A rope control device as recited in claim 1, in which:
    the main part defines a longitudinal axis; and
    at least one projection portion comprises:
        a proximal portion that extends away from the longitudinal axis at an angle to the longitudinal axis;
        an intermediate part that is substantially parallel to the longitudinal axis; and
        a distal portion that extends towards the longitudinal axis at an angle relative to the longitudinal axis.

13. A rope control device as recited in claim 1, in which:
    the main part defines a longitudinal axis;
    a pair of projection portions extend from each end portion of the main part;
    an end recess is formed by each pair of projection portions;
    each projection portion comprises a distal portion that extends towards the longitudinal axis; and
    the projection portions are configured to define first and second end recess each comprising
        an inlet portion between the distal portions of each pair of projection portions,
        a main portion between each inlet portion and each end portion;
        first and second lateral portions between each distal portion and one of the friction surfaces.

14. A rope control device comprising:
a main part defining
a central opening,
first and second side portions,
first and second end portions,
first and second projection portions extending from the first end portion,
third and fourth projection portions extending from the second end portion, and
first and second friction surfaces formed at junctures of the first and second projection portions and the first end portion, and
third and fourth friction surfaces formed at junctures of the third and fourth projections portions and the second end portion; and
a bar part pivotably attached to the first side portion; where
the bar part may be in a closed position in which the bar part engages the second side portion of the main part;
the rope control device may be in an open configuration in which the bar part does not engage the second side portion; and
when the bar part is in the closed position, the main part and the bar part define first and second opening portions of the central opening;
the main part defines a longitudinal axis;
a first end recess is formed by the first and second projection portions;
a second end recess is formed by the third and fourth projection portions; and
each of the projection portions defines a distal portion that is angled inwardly towards the longitudinal axis.

15. A rope control device as recited in claim 14, in which each distal portion extends one of the friction surfaces.

16. A rope control device as recited in claim 14, in which the bar part comprises a bar member and a cap member.

17. A rope control device comprising:
a main part defining
a central opening,
first and second side portions,
first and second end portions,
at least one projection portion extending from each end portion, and
a friction surface formed at junctures of each end portion and the at least one projection portion adjacent thereto; and
a bar part pivotably attached to the first side portion; where
the bar part may be in a closed position in which the bar part engages the second side portion of the main part;
the rope control device may be in an open configuration in which the bar part does not engage the second side portion;
when the bar part is in the closed position, the main part and the bar part define first and second opening portions of the central opening;
the main part defines a longitudinal axis; and
at least one projection portion comprises:
a proximal portion that extends away from the longitudinal axis at an angle to the longitudinal axis;
an intermediate part that is substantially parallel to the longitudinal axis; and
a distal portion that extends towards the longitudinal axis at an angle relative to the longitudinal axis.

18. A rope control device comprising:
a main part defining
a central opening,
first and second side portions,
first and second end portions,
at least one projection portion extending from each end portion, and
a friction surface formed at junctures of each end portion and the at least one projection portion adjacent thereto; and
a bar part pivotably attached to the first side portion; where
the bar part may be in a closed position in which the bar part engages the second side portion of the main part;
the rope control device may be in an open configuration in which the bar part does not engage the second side portion;
when the bar part is in the closed position, the main part and the bar part define first and second opening portions of the central opening;
the main part defines a longitudinal axis;
a pair of projection portions extend from each end portion of the main part;
an end recess is formed by each pair of projection portions;
each projection portion comprises a distal portion that extends towards the longitudinal axis; and
the projection portions are configured to define first and second end recess each comprising
an inlet portion between the distal portions of each pair of projection portions,
a main portion between each inlet portion and each end portion;
first and second lateral portions between each distal portion and one of the friction surfaces.

* * * * *